United States Patent [19]
Ostdiek et al.

[11] 3,765,224
[45] Oct. 16, 1973

[54] INSTRUMENT FOR MEASUREMENT OF FLUID DENSITY OR COMPOSITE FLUID MIXING RATIO

[76] Inventors: Arthur J. Ostdiek, 1224 Dalewood Dr., Wheaton; Francis M. Manion, 1705 Evelyn Dr., Rockville, both of Md.

[22] Filed: June 22, 1972

[21] Appl. No.: 263,137

[52] U.S. Cl. .................... 73/32 R, 73/515
[51] Int. Cl...... G01n 9/00, G01n 9/30, G01p 15/00
[58] Field of Search................... 73/32, 194, 505, 73/515

[56] References Cited
UNITED STATES PATENTS

| | | | |
|---|---|---|---|
| 3,580,087 | 5/1971 | Sampson | 73/32 |
| 2,215,447 | 9/1940 | Kollsman | 33/204 |
| 3,343,790 | 9/1967 | Bowles | 73/505 |
| 3,290,947 | 12/1966 | Reilly | 73/505 |
| 3,203,237 | 8/1965 | Ogren | 73/505 |

Primary Examiner—Herbert Goldstein
Attorney—Harry M. Saragovitz et al.

[57] ABSTRACT

A vortex concentration sensor comprising a shallow cylindrical chamber having a porous sidewall equally divided such that a plenum connected to one half supplies a fluid of one density and a plenum connected to the other half of the porous sidewall supplies a second fluid of an unknown density. The axis of the chamber transverse to the principle cylindrical axis and apportioning the sidewall between the two plena is oriented parallel to a constant acceleration field such as the earth's gravitational field. Inside the chamber, preferably in the center, is located a drain for the fluid issuing from the sidewall. An airfoil pickoff is located near the drain inside the chamber to sense the streamline angle of a vortex created by the unequal forces acting upon the molecules of the two different fluids issuing into the chamber. When the device is oriented in the manner prescribed a signal is produced at the airfoil pickoff that is a function of the density difference between the two fluids. Knowing the density of one of the fluids and the value of the earth's gravitational field the output is a direct function of the density of the unknown fluid. Alternatively if the mixing ratio of a particular fluid is to be determined, the output of the airfoil pickoff then becomes a function of the mixing ratio of the constituients of the unknown fluid.

10 Claims, 1 Drawing Figure

PATENTED OCT 16 1973  3,765,224
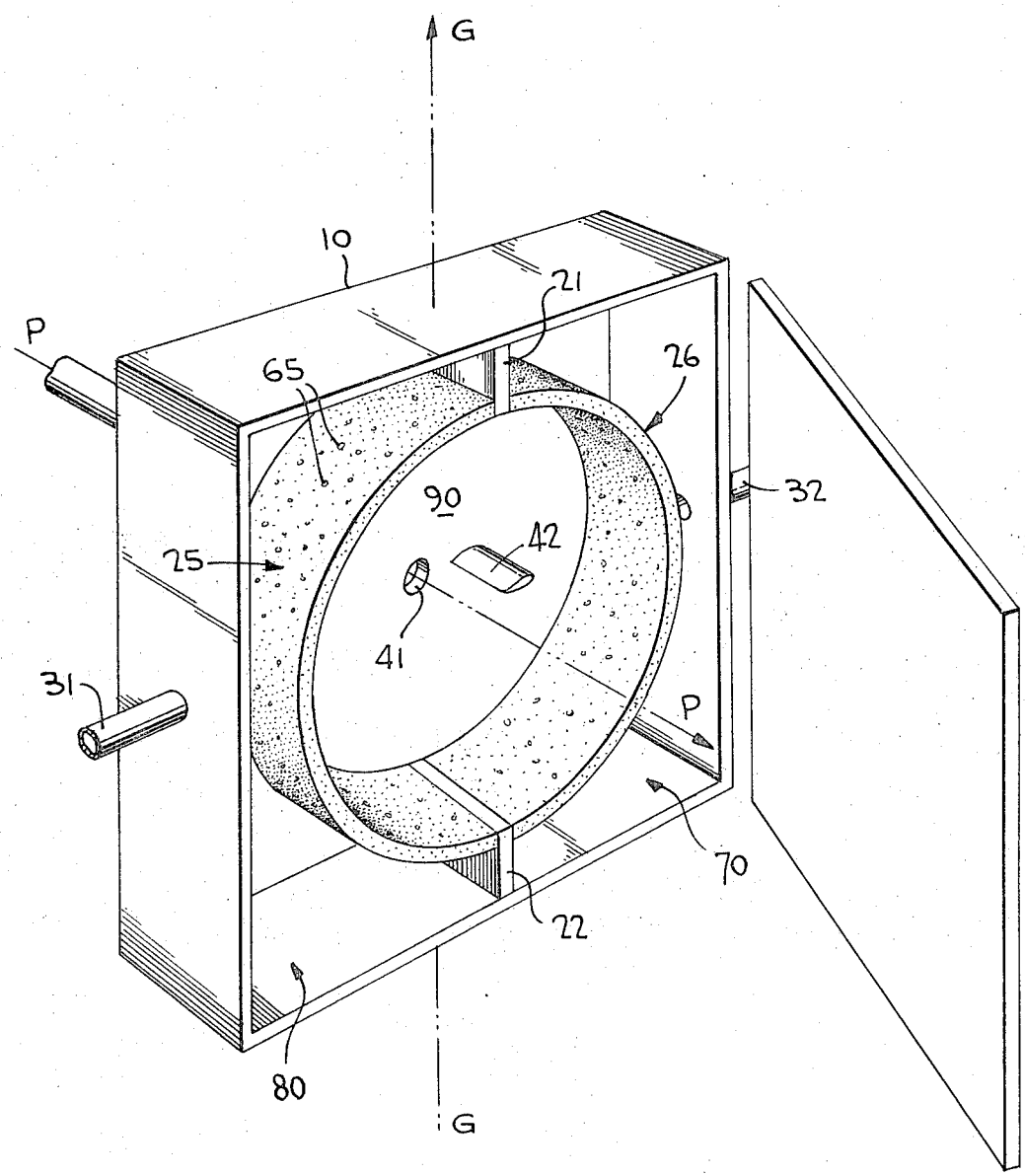

INSTRUMENT FOR MEASUREMENT OF FLUID DENSITY OR COMPOSITE FLUID MIXING RATIO

RIGHTS OF THE GOVERNMENT

The invention described herein may be manufactured, used, and licensed by or for the United States Government for governmental purposes without the payment to the inventor of any royalty thereon.

BACKGROUND OF THE INVENTION

The fluidic device most closely related to this invention is a vortex rate sensor invented almost a decade ago. In that device, fluid was forced regularly into a short cylindrical chamber throughout a porous outer wall and exhausted through a drain in the endwalls at the chamber axis. This sensor produced a signal that was a function of the rate of which the device turned or rotated in inertial space about its longitudinal principle axis. Note the device herein disclosed is significantly distinguished from that primordial invention.

It is, therefore, an object of this invention to provide a vortex concentration sensor having no moving parts for the measurement of the density of an unknown fluid. Another object of this invention is to provide a flueric vortex concentration sensor that will measure the mixing ratio of a fluid mixture whose component densities are known.

It is yet an additional object of this invention to provide a vortex concentration sensor which utilizes the earth's gravitational field as a constant acceleration source. These and other objects of this invention will become more fully apparent with reference to the following specification and drawing which relate to a preferred embodiment of this invention.

SUMMARY OF THE INVENTION

Briefly, in accordance with invention, a vortex concentration sensor is provided which utilizes two separate plena as sources of two different fluids measurement of the streamline angle formed by vortex within the sensor chamber provides a measure of the density of one of the fluids. The density of the other fluid is known and, the vortex concentration sensor is oriented in the earth's gravitational field such that an axis of symmetry perpendicular to principle axis of the vortex rate sensor chamber and equally dividing the sensor chamber between the two plena is co-parallel with the earth's gravitational field. The vortex concentration sensor chamber is a flat cylindrical cavity having a drain located parallel to the principle axis of the cavity and in its floor, with an airfoil pickoff for detecting the streamline angle located nearby.

BRIEF DESCRIPTION OF THE DRAWING

The specific nature of the invention as well as other objects, aspects, uses, and advantages thereof will be clearly understood from the following description and from the accompanying drawing which is a perspective of the essential parts of the vortex concentration sensor.

DESCRIPTION OF THE PREFERRED EMBODIMENT

The drawing is a representation of an embodiment of the vortex concentration sensor comprising two plena 70 and 80 and a flat cylindrical chamber 90 having a drain 41 and an airfoil pickoff 42 therein. The sidewall of the chamber 90 comprises two porous members 25 and 26. These members are bilaterally and symmetrically disposed with respect to the G—G axis. Members 25 and 26 form the flat cylindrical chamber 90 having as its principle axis the P—P axis. The two plena 80 and 70 and the two sidewall members 25 and 26 respectively are separated from each other by seal members 21 and 22. Seal members 21 and 22 are rectangular blocks located along the G—G axis and upright within the housing member 10. Connected to the housing 10 are supply inlets 31 and 32 which are for plena 80 and 70, respectively.

In operation, a fluid of one density issues from plena 80 into the chamber 90 and fluid of another unknown density issues from plena 70 into the chamber 90 and in turn each fluid is acted upon by the gravitational field along the axis G—G. The action of this gravitational field upon the molecules of the two fluids is such that unequal forces act upon fluids of unequal molecular weights or densities thus causing a vortex flow to occur inside chamber 90 as the fluids exit the chamber through drain 41. The streamline angle of the vortex so created inside chamber 90 is measured by the airfoil pickoff 42. The streamline angle of the vortex so created is a function of the difference of the forces acting upon the fluids of different densities. Accordingly the airfoil pickoff output is a function of the density of the unknown fluid. Should the density of the second fluid be known and a mixing ratio of, for example, two constituients of this fluid is to be determined, this becomes a function of the output of the airfoil pickoff. Thus the ratio of the constituients of a composite fluid mixture may be determined using this vortex concentration sensor.

An approximate analytical method is used to show the value of the angle, $\alpha$, between a streamline and a radial line. This value in radians is given by $$\alpha = (\rho_1 - \rho_2/\rho_1 + \rho_2)\, g\, (8\pi h^2 R_o^3/3\, Q^2) \tag{1}$$

provided $$Re'_o = (Qh/2\pi \nu R_o^2) \geq 7, \tag{2}$$

where $\rho_1$ = density of reference fluid
$\rho_2$ = density of sample fluid
$g$ = magnitude of gravitational acceleration field
$h$ = height of chamber
$R_o$ = outside radius of chamber
$Q$ = volumetric flow rate of one fluid
$\nu$ = kinematic viscosity and
$Re'_o$ = modified Reynolds number For the following values:

$Re'_o = 7$
$R_o = 6$ inches
$h = 1$ inch
$\nu = 160 \times 10^{-6}$ ft /second (room temperature)   (3)

it may be derived from equations (1) and (2) that if $$\rho_2 = (1 - 10^{-6})\, \rho_1,$$

then $\alpha = 3 \times 10^{-4}$ radians. Therefore, for the pickoff 42 indicated herein, the specified model can resolve stream line angle of the order of $10^{-4}$ to $10^{-5}$ radians or the equivalent of less than a part per million density change in the fluid mixture of the device herein specified. It is to be noted that the resolution of the device is limited by the noise in any electronic transducer connected to the pickoff 42 and used to measure the pressure difference generated by the pickoff. The noise level of such an electronic transducer is equivalent to several parts per million density change in the fluid within the cavity 90.

It is to be understood that this invention is not to be limited to the exact details of construction shown and described for obvious modifications will occur to persons skilled in the art thereof.

What is claimed is:

1. A vertex concentration sensor comprising a chamber, having an axis of symmetry, at least two plena opening into said chamber, said plena being symmetrically disposed with respect to said axis of symmetry, said axis of symmetry being oriented parallel to a constant acceleration field, a first fluid supplied to said chamber by one plenum, a second fluid supplied to said chamber by another plenum, said first fluid having a known density, said second fluid having an unknown density, an unobstructed drain located in said chamber, and a stationary airfoil pickoff located in said chamber on a radial line extended from said drain perpendicular to said acceleration field.

2. The vortex concentration sensor of claim 1 wherein said plena are bilaterally disposed with respect to said axis of symmetry.

3. The vortex concentration sensor of claim 2 wherein said chamber is a shallow cylindrical cavity having a bottom and a side wall with small holes therein, said plena being connected to said small holes.

4. The vortex concentration sensor of claim 3 wherein said plena are symmetrically located with respect to an axis perpendicular to the principal axis of said chamber.

5. The vortex concentration sensor of claim 4 wherein said plena are bilaterally located with respect to an axis perpendicular to the principal axis of said chamber.

6. The vortex concentration sensor of claim 5 wherein said known fluid and said unknown fluid provide a vortex having streamlines, said streamlines having a streamline angle.

7. The vortex concentration sensor of claim 6 wherein said drain is located in the center of the bottom of said cavity.

8. The vortex concentration sensor of claim 6 wherein said airfoil is mounted near said drain.

9. The vortex concentration sensor of claim 8 wherein said airfoil is a sensor which provides pressure signals, said signals being proportioned to the streamline angle within said chamber.

10. The vortex concentraion sensor of claim 9 wherein said streamline angle provides a measure of said unknown density.

* * * * *

PO-1050
(5/69)

UNITED STATES PATENT OFFICE
CERTIFICATE OF CORRECTION

Patent No. 3765224      Dated October 16, 1973

Inventor(s) Arthur J. Ostdiek and Francis M. Manion

It is certified that error appears in the above-identified patent and that said Letters Patent are hereby corrected as shown below:

[73] Assignee: The United States of America as represented by the Secretary of the Army, Washington, D. C.

[21] Appl. No.: 265,137

Signed and sealed this 19th day of March 1974.

(SEAL)
Attest:

EDWARD M. FLETCHER, JR.
Attesting Officer

C. MARSHALL DANN
Commissioner of Patents